UNITED STATES PATENT OFFICE.

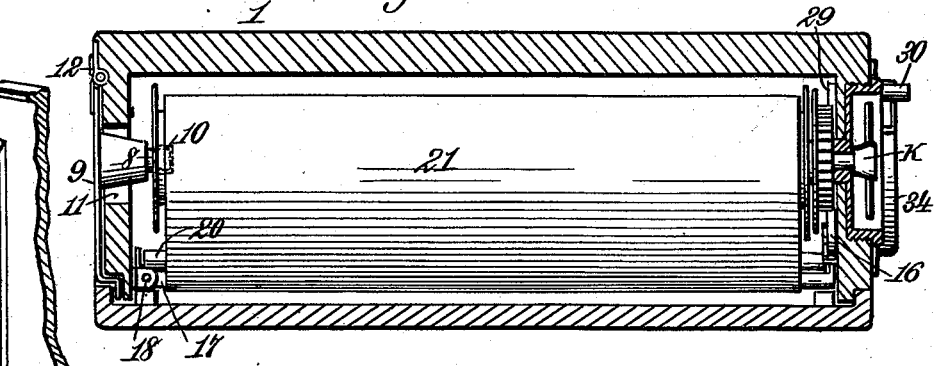

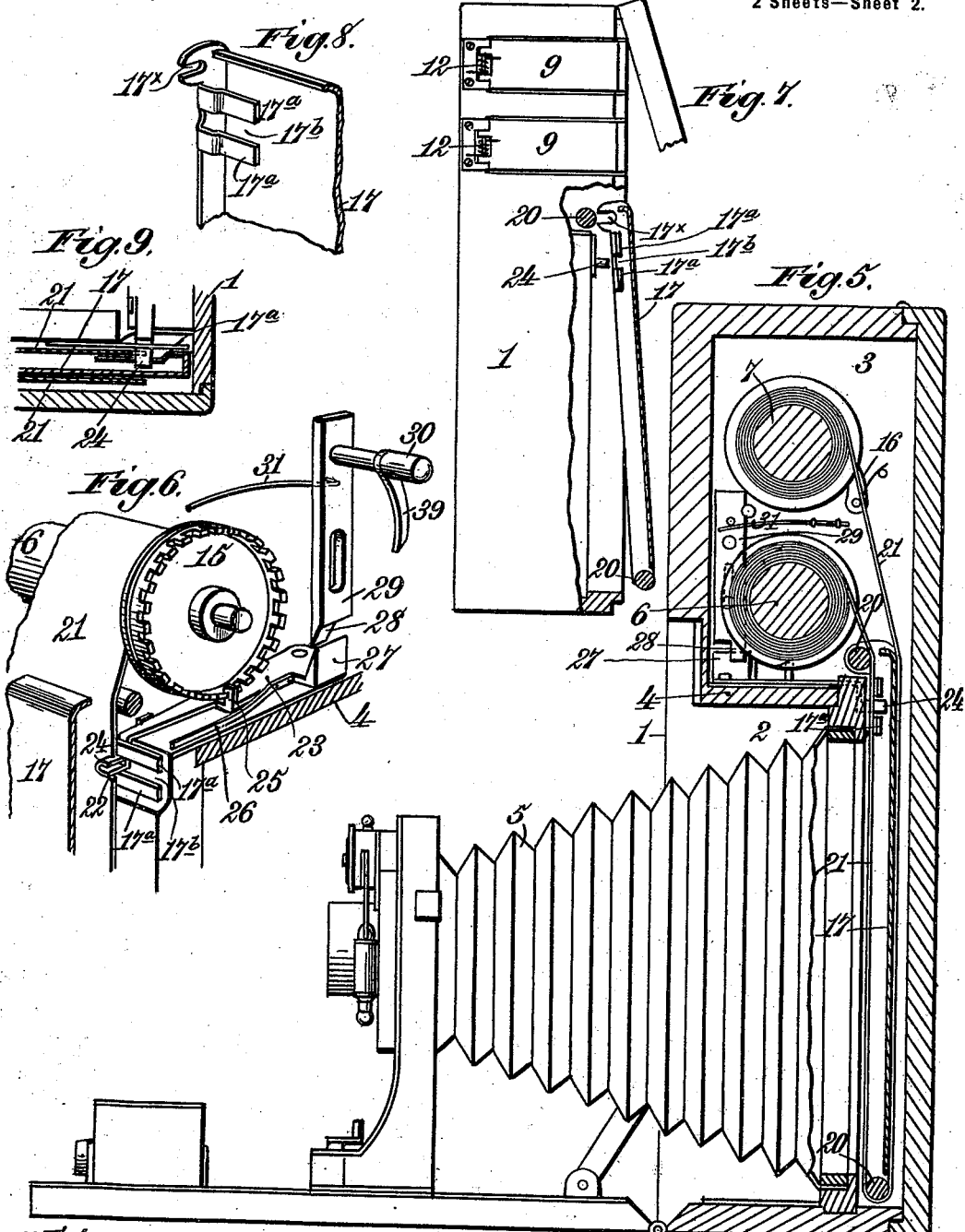

HAR EY B. CARLTON AND JOSEPH GODDARD, OF ROCHESTER, NEW YORK; SAID GODDARD ASSIGNOR TO SAID CARLTON.

PHOTOGRAPHIC CAMERA.

SPECIFICATION forming part of Letters Patent No. 689,792, dated December 24, 1901.

Application filed February 1, 1901. Serial No. 45,638. (No model.)

*To all whom it may concern:*

Be it known that we, HARVEY B. CARLTON and JOSEPH GODDARD, citizens of the United States, residing at Rochester, in the county of Monroe and State of New York, have invented new and useful Improvements in Photographic Cameras, of which the following is a specification.

Our invention relates to improvements in photographic cameras adapted to contain and expose a continuous sensitive film, and has for its object to provide a novel arrangement of the film-spool and take-up roll with relation to the exposing or dark chamber in connection with a swinging film-guide for facilitating the stringing or training of the film from the film-spool about the film-guide and onto the take-up roll.

Our invention has for its further object the provision of a novel arrangement of stop mechanism to operate in connection with a film of the invention of John A. Robertson, of Rochester, New York, as set forth in his application, Serial No. 45,643, filed April 1, 1901, whereby the rotation of the film-spool at intervals between the several exposure or negative surfaces of the film is automatically stopped and whereby the withdrawal of just the required amount of film for a given exposure or negative is permitted and the withdrawal of an excessive amount prevented.

The invention also has for its object a novel arrangement of indicator in combination with the stop mechanism.

To the ends stated the invention consists in a camera constructed and arranged as hereinafter described, reference being made to the accompanying drawings.

That which is regarded as new is set forth in the clauses of the claim appended to the specification.

In the accompanying drawings, Figure 1 is a perspective view of the camera, the film-spool and take-up roll being removed. Fig. 2 is a sectional view showing the manner of mounting the take-up roll; Fig. 3, a similar view showing the manner of mounting the film-spool. Fig. 4 is a detail view of the indicating mechanism. Fig. 5 is a vertical sectional view of the camera. Fig. 6 is a detail perspective view showing the end of the film-spool and the stop mechanism in engagement therewith, and Fig. 7 is a detail view showing the spring-hinged standards for the film-spool and take-up roll and illustrating the film-guide pivoted transversely of the camera-box. Figs. 8 and 9 are detail views, the latter partly in section.

In the said drawings the reference-numeral 1 designates a camera box or casing which, while adapted to accommodate elements of a size suitable for taking large pictures, is of very little depth—a consideration of importance to the compactness and convenient portability of the camera and which is permitted by our novel arrangement and location of the film-spool and take-up roll.

The camera casing or box 1 is divided into two compartments 2 and 3, separated by a dividing-partition 4. Of these compartments the larger, 2, is an exposing-chamber and adapted to receive and house the lens-carrier bellows 5 and appurtenances, which are shown conventionally only, as their construction is not different from like parts of known cameras. The other compartment, 3, is a roll-holding compartment and receives the film-spool 6 and take-up roll 7, which are arranged therein contiguous or close to each other, as shown. This compartment and the contents thereof are arranged or located at one side of and in the same plane with the exposing-chamber, and by the disposition of compartments and contents great compactness is secured. Both the film-spool and take-up roll are supported at one end on stud-journals 8, carried by standards 9, which are hinged to the outside of the camera for the purpose of permitting the convenient withdrawal of the stud-shafts from the sockets 10 of the film-spool and take-up roll which receive said studs. The studs project into the interior of the camera-casing through holes 11, formed in the side wall thereof, and enter the sockets of the film-spool and take-up roll, being normally held in engagement with the sockets 10 by the springs 12 of the standards 9. The other ends of said spool and roll are provided with angular lug-sockets 13, which receive similarly-shaped lugs 14, projecting from ratchet-wheels 15. The ratchet-wheels 15 are rotatably mounted in the side wall of the camera-box, and that of the take-up roll is provided with a key K, by which it may be rotated to withdraw the film from the spool and wind the same upon itself. A spring-pressed pawl 16 is mounted on the said wall of the camera and engages the ratchet of the take-up roll, permitting take-up rotation of said roll, but preventing reverse rotation. By these devices the film-spool and take-up roll are journaled and operated to supply the film for exposure and receive it after exposure.

The numeral 17 indicates a film-guide about which the film is trained in its passage from the film-spool to the take-up roll. This guide lies across the exposing chamber or compartment 3 of the camera, whereby in moving from the film-spool to the take-up roll the film traverses the exposing-chamber in which each negative or exposure surface comes to rest for the exposure. The film-guide is pivotally hung transversely of the camera box or casing, along a side wall thereof, as shown at 18, or adjacent the dividing-partition 4, whereby it may be swung out from its position across the exposure-chamber to facilitate the training or stringing of the film therearound in its passage from the film-spool to the take-up roll. In the first-mentioned arrangement the guide swings across the line of film travel and in the latter in such line. In Figs. 1 and 2 the pivotal connection of the film-guide is a hinge, while, as more clearly shown in Fig. 7, it is in the form of an open pivot-socket 17*, with which the film-guide is provided, fitting one of the rollers 20, hereinafter referred to, whereby, if desired, the film-guide may be entirely removed when arranging the film or for other purpose.

It will be seen that the hinged or swinging film-guide simplifies and renders expeditious the operation of passing the film from the spool over and around the guide and attaching it to the take-up roll, and especially is this so where the said guide is arranged to swing across the line of travel of the film—for instance, to a side wall of the camera—as with this arrangement the operation is very simple and is accomplished by swinging the guide away from its position across the exposing-chamber, pulling a length of film approximately a little more than twice the length of the face of the guide, and then swinging the latter upon the film across the exposing-chamber and turning the free end of the film back upon the guide and attaching it to the take-up roll. That part of the film which rests against the front face of the guide will now be in the proper focal plane.

The film-guide is rounded at its edges, the rounded formation being afforded in the example shown in the drawings by rollers or rotatable sleeves 20, mounted upon spindles at the edges of the guide. These rounded formations, and particularly the roller or rotating-sleeve form thereof, permit the film to travel easily and with no appreciable friction and avoid the possibility of the film being caught at any point and being rumpled or otherwise damaged.

The film 21 is provided at intervals, according to the dimensions of the several exposure or negative surfaces thereof and marking the divisional lines between such surfaces, with recesses 22, which coöperate with the stop mechanism next to be described in locking the film-spool from rotation when a given negative or exposure surface has been wound from said spool and presented across the exposure-chamber for exposure. We make no claim to the film having this construction *per se*, as the same is the invention of another. This part of our invention resides in a novel construction and arrangement of stop mechanism coöperating with and permitted to operate by such a film.

In the film-holder chamber 3 is arranged a two-arm rock-lever 23, pivoted at one end to the dividing-partition 4, and at its other and free end a "nose" 24 projects into the path of travel of the film. This lever is provided intermediate its ends with a dog 25, adapted to engage the ratchet of the film-spool and lock the latter from rotation. The tendency of the dog 25, under the influence of a spring 26 acting on the rock-lever, is to be in engagement with the ratchet at all times; but it is normally held out of engagement therewith by the film. The nose of the lever 23 rests against the edge of the film as it passes from the film-spool, and thus normally holds the dog 25 out of engagement with the ratchet of said spool, the latter being free to rotate. When, however, in the unwinding of the film the requisite amount for an exposure has been withdrawn and a stop-recess 22 arrives opposite the nose of the lever, the latter, under the impulse of the spring 26, enters the recess, and the dog engages teeth of the film-spool, locking the latter from rotation and preventing further withdrawal of the film until the locking engagement of the parts is released at the will of the operator when it is desired to take a fresh exposure. In this way the correct presentation for exposure of the several negative-surfaces is accomplished and mistakes liable to occur by inattention or lack of care or skill in the operator avoided.

A film-guard is provided in line with the nose of the lever 23 and consists of plates 17ª, one of the same being on the film-guide and the other on a suitable part of the camera, such as the bellows-frame F, and each provided with a raceway 17ᵇ for the nose, as best shown in Figs. 1, 6, and 8. In the preferred form shown the free end of the lever 23 is offset and passes between one of the plates 17ª and the bellows-frame, its nose 24 spanning the passage between the plates 17ª and playing in the nose-races 17ᵇ thereof. In operation the film 21 passes between the two plates, as clearly shown in Fig. 9, and when a stop-recess thereof comes opposite the nose of the lever engages the same, as before described.

The film-guard supports the film at each side of the point of engagement and prevents tearing or other marring of the film. We regard this arrangement as a valuable feature of invention whether the film-guide be a swinging one or not.

The short arm of the rock-lever is provided with an incline 27, with which a counterpart incline 28 at the end of a slide 29 is adapted to engage. This slide is provided with a handle 30, that extends through a slot in the casing, so that the incline 28 thereon may be thrown into and withdrawn from engagement with the incline 27 on the rock-lever. The function of this slide when the incline 28 is projected into operative engagement with the incline 27 of the rock-lever is to oscillate said lever on its pivot when the nose thereof is in engagement with a stop-recess of the film and withdraw it from said recess and at the same time withdraw the dog 25 from engagement with the ratchet of the film-spool to enable a fresh exposure or negative surface to be unwound from the spool. The parts are held momentarily in this position to enable the stop-recess to pass out of the line of the nose of the lever, after which it is withdrawn and the nose of the lever rests upon the edge of the film during its travel until the next stop-recess arrives, when the locking operation is repeated. The withdrawal of the slide just referred to may be accomplished by the operator retracting it manually through the medium of the handle 30, or, if desired, the withdrawal may be effected by means of the springs 31.

In connection with the stop and release mechanism we provide an indicating mechanism, which is operated by the movement of the slide-handle in releasing locking engagement of the dog and film-spool, to indicate the number of exposure or negative surfaces unwound from the spool. This indicating mechanism consists of a disk 32, bearing suitable numerals, which appear through a perforation 33 in the disk-cover 34. The said disk is mounted upon an axle 35, projecting from a plate 36, which also carries a spring-pawl 37 for preventing backward movement of the disk. The disk-cover 34 is provided with a slot 38, in which moves a finger 39, carried by the handle of the slide and moving therewith. When the slide is projected to release the film-spool from the locking mechanism, as described, this finger engages a tooth of the indicating-disk and rotates the latter a distance equal to that between the numerals thereon, whereby at each operation a new numeral appears in the observation-opening 33, by inspection of which the operator may know how many exposures have been made and ascertain the exhaustion or approach of exhaustion of the film.

Having thus described our invention, what we claim is—

1. In a photographic camera, the combination with a casing containing an exposing-chamber and a film-holding compartment located at one side thereof, of a swing film-guide arranged across the exposure-chamber, substantially as described.

2. In a photographic camera, the combination with a casing containing an exposing-chamber and a film-holding compartment located at one side thereof, of a swing film-guide arranged across the exposure-chamber and adapted to be swung across the line of film travel, substantially as described.

3. In a photographic camera, the combination with a casing containing an exposure-chamber and a film-holding compartment arranged at one side thereof, of a swing film-guide arranged across the exposure-chamber and provided with rounded edges, substantially as described.

4. In a photographic camera, the combination with a casing containing an exposure-chamber and a film-holding compartment located at one side thereof, of a swing film-guide arranged across the exposure-chamber, and a rotating sleeve at the edge of said guide over which the film passes, substantially as described.

5. In a photographic camera, the combination with a casing containing an exposure-chamber and a film-holding compartment, a film-spool and take-up roll arranged in said compartment contiguous to each other, and a swing film-guide arranged across the exposure-chamber, substantially as described.

6. In a photographic camera, the combination with a film-carrier and means for locking the same from rotation, an element of which is adapted to engage the film, of a film-guard at the point of engagement of such element with the film, substantially as described.

7. In a photographic camera, the combination with a film-spool and means for locking the same from rotation an element of which is adapted to engage the film, of a bellows-frame and film-guide provided with a guard for the film at the point of engagement of such element with the film, substantially as described.

8. In a photographic camera, the combination with a film-carrier and means for locking the same from rotation an element of which is adapted to engage the film, of a film-guard provided with a raceway for the engaging element, substantially as described.

9. In a photographic camera, the combination with a film-holder compartment, of swing-standards arranged outside the camera-casing, and stud-journals projecting from said standards into said compartments, substantially as described.

10. In a photographic camera, the combination of a film-holder compartment, of spring-hinged swing-standards arranged outside the camera-casing, and stud-journals projecting from said standards into said compartments, substantially as described.

11. In a photographic camera, the combination with a casing provided with an exposing-chamber and a film-holder compartment, of a swing film-guide extending across the exposing-chamber, a film-spool and take-up roll arranged in the film-holder compartment, a film adapted to be passed from said film-spool about said guide and be engaged with the take-up roll, said film being provided with stop-recesses, and stop mechanism normally out of engagement with the film-spool and provided with an element which automatically enters the stop-recesses in the film, whereby the stop mechanism is engaged with the spool and prevents its rotation, substantially as described.

12. The combination with a film-spool and take-up roll, of a spring-pressed rock-lever, one arm of which is adapted to engage the film and the other arm provided with an incline, a dog carried by said lever and adapted to engage the film-spool to lock the latter from rotation, and a slide provided with an incline to engage the incline of the rock-lever for withdrawing the dog from engagement with said spool, substantially as described.

13. The combination with a film-spool and take-up roll, of a spring-pressed rock-lever one arm of which is adapted to engage the film, a dog carried by the lever and adapted to engage the spool to lock the latter from rotation, and a slide to engage the other arm of the rock-lever for withdrawing the dog from engagement with the spool, substantially as described.

14. The combination with a film-spool and take-up roll, of a spring-pressed rock-lever one arm of which is adapted to engage the film, and the other arm provided with an incline, a dog carried by said lever and adapted to engage the film-spool to lock the latter from rotation, and a slide adapted to engage the incline of the rock-lever for withdrawing the dog from engagement with said spool, substantially as described.

15. In a photographic camera, the combination with a casing provided with an exposing-chamber and a film-holder compartment, of a swing film-guide extending across the exposing-chamber, a film-spool and take-up roll arranged in the film-holder compartment, a film adapted to be passed from said film-spool about said guide and be engaged with the take-up roll, said film being provided with stop-recesses, stop mechanism normally out of engagement with the film-spool and provided with an element which automatically enters the stop-recesses in the film, whereby the stop mechanism is engaged with the spool and prevents its rotation, an indicating device, and a slide provided with means for engaging and withdrawing the stop mechanism and also with means for engaging and actuating the indicating device, substantially as described.

16. The combination with a film-spool and take-up roll, of a spring-pressed rock-lever one arm of which is adapted to engage the film, a dog carried by the lever and adapted to engage the spool to lock the latter from rotation, an indicating device, and a slide provided with means to engage one arm of the rock-lever to withdraw the other arm of said lever from engagement with the film and provided also with an arm for engaging and actuating the indicating device, substantially as described.

In testimony whereof we have hereunto set our hands in presence of two subscribing witnesses.

HARVEY B. CARLTON.
JOSEPH GODDARD.

Witnesses:
FRED D. MORGAN,
JOHN A. ROBERTSON.